United States Patent [19]
Kato et al.

[11] Patent Number: 5,702,260
[45] Date of Patent: *Dec. 30, 1997

[54] ROTARY CONNECTOR

[75] Inventors: Hironori Kato, Sendai; Masanori Nakao, Furukawa; Yuichi Ida, Miyagi-ken, all of Japan

[73] Assignee: Alps Electric Co., Ltd., Tokyo, Japan

[*] Notice: The portion of the term of this patent subsequent to Jan. 31, 2015, has been disclaimed.

[21] Appl. No.: 632,943

[22] Filed: Apr. 16, 1996

Related U.S. Application Data

[62] Division of Ser. No. 401,598, Mar. 9, 1995, Pat. No. 5,562,466.

[30] Foreign Application Priority Data

Mar. 9, 1994 [JP] Japan .................................. 6-38346
May 20, 1994 [JP] Japan .................................. 6-106839

[51] Int. Cl.⁶ .................................................... H01R 35/04
[52] U.S. Cl. ................................................ 439/164; 439/15
[58] Field of Search ................................... 439/165, 15

[56] References Cited

U.S. PATENT DOCUMENTS

| | | |
|---|---|---|
| 4,735,573 | 4/1988 | Zeller et al. ........................ 439/15 |
| 4,838,803 | 6/1989 | Kondo ................................ 439/164 |
| 4,978,191 | 12/1990 | Hasegawa et al. ............... 439/164 |
| 5,230,713 | 7/1993 | Schauer ............................. 439/164 |
| 5,238,419 | 8/1993 | Roeder et al. ..................... 439/15 |
| 5,248,260 | 9/1993 | Ida et al. ........................... 439/15 |
| 5,256,075 | 10/1993 | Miyahara et al. ................. 439/164 |
| 5,286,219 | 2/1994 | Ueno et al. ........................ 439/164 |
| 5,304,071 | 4/1994 | Bannai et al. ..................... 439/15 |
| 5,389,002 | 2/1995 | Matsuda et al. .................. 439/164 |
| 5,495,996 | 3/1996 | Sakamoto et al. ................ 439/439 |

*Primary Examiner*—Gary F. Paumen
*Attorney, Agent, or Firm*—Guy W. Shoup; Patrick T. Bever

[57] ABSTRACT

A rotary connector including a first housing rotatably connected to a second housing and forming an annular space therebetween, and a flexible cable wound within the annular spacing. According to a first aspect, the conductors of the flexible cable associated with an airbag circuit are spaced further apart than conductors for other circuits mounted on a steering wheel. A direct connector includes first terminals connected to the airbag conductors and second terminals connected to the other conductors. The first and second terminals are spaced apart and/or divided by a divider to prevent interference during assembly. In accordance with the second aspect, a locking member for preventing relative rotation of the first and second housings prior to assembly on a vehicle includes a cover portion for covering an open end of the direct connector.

3 Claims, 5 Drawing Sheets

ROTARY CONNECTOR

This application is a division of Ser. No. 08/401,598 filed Mar. 9, 1995, now U.S. Pat. No. 5,562,466.

BACKGROUND OF THE INVENTION

1. Field of the Invention

The present invention relates to a rotary connector for electrically connecting a pair of housings, which are coupled to each other in such a manner as to be relatively rotatable, through a flexible cable, and more particularly, to a rotary connector for use in connection of a plurality of circuits mounted on a steering wheel of a vehicle including an air bag circuit and other circuits, such as a horn circuit or an automatic cruise control circuit.

2. Description of the Related Art

Rotary connectors of the above-described type generally include a pair of housings coupled to each other in such a manner as to be relatively rotatable, and include a belt-like flexible cable accommodated in an annular space defined between the two housings. The two ends of the flexible cable are electrically connectable to an exterior of the housings when the flexible cable is fixed to the two housings. The flexible cable has a plurality of parallel conductors. A connector is connected to the end of the portion of the flexible cable which extends externally from the housing. Such a connector is generally a special connector connected to the end of the portion of the flexible cable which extends externally from the housing over a predetermined length. An alternate connector connected to the end of the externally extended portion of the flexible cable is the direct coupling type connector disclosed in U.S. Pat. No. 5,230,713. This connector has a plurality of terminals provided on the housing and is connected to the conductors of the flexible cable.

The rotary connector arranged in the manner described above is assembled in a steering device of a vehicle and is used as electrical connection means between various circuits, such as an air bag circuit or a horn circuit. In that case, one of the housings of the rotary connector is connected to a steering column (a stator), while the other housing is connected to a steering wheel (a rotor). The special connectors or direct connectors connected to the two ends of the flexible cable are connected to external connectors mounted in an air bag inflator or a horn switch.

When a driver turns the steering wheel in either of the two directions while driving a vehicle, the housing mounted on the steering wheel turns in the same direction as that of the steering wheel, winding or unwinding the flexible cable in the rotary connector depending on the direction of turning of the steering wheel. In either state, electrical connection between the rotor and the stator is maintained by the flexible cable of the rotary connector.

When the rotary connector is assembled in the steering device of a vehicle, the flexible cable must be assembled in a state wherein it can be wound or unwound by almost the same amount from a reference position associated with the neutral turning position of a steering wheel.

Hence, the rotary connector is provided with a locking mechanism for maintaining the two housings at the neutral turning position until the rotary connector is assembled in a steering device. Such a rotary connector is designed such that free turning of the two housings is impeded until the rotary connector is assembled in the steering device, by the locking member mounted relative to the two housings which have been positioned at the neutral turning position. The locking member is removed from the two housings when one of the housings is fixed to the steering column.

In recent years, the number of circuit parts provided on the steering wheel of a vehicle has begun to increase. That is, there is an increasing demand for providing, on the pad of a steering wheel, control switches for, for example, an automatic cruise control circuit or an air conditioner circuit, in addition to the air bag inflator and the horn switch. An increase in the number of circuits connected by the rotary connector inevitably increases the number of conductors of the flexible cable. However, the space near the steering device is limited, and an increase in the width of the flexible cable is thus restricted. As a result, the electrical insulation distance between the conductors is reduced, and this makes insulation of the conductor used for an air bag more important than the insulation used for other conductors because a larger amount of current, compared to that which flows in other conductors, flows in the air bag conductor to actuate the air bag inflator.

However, in the case of the aforementioned direct connector, since the terminals are connected directly to the conductors in the connector provided on the housing by, for example, spot welding or soldering, a decrease in the pitch between the conductors, caused by an increase in the number of conductors of the flexible cable, reduces the distance between the adjacent connecting portions, thus reducing the electrical insulation distance. Thus, the direct connector is not suited for connection of multiple circuits.

In view of the aforementioned problems of the prior art, an object of the present invention is to provide a rotary connector which is suitable for use in connection of multiple circuits.

U.S. Pat. No. 5,230,713 discloses the direct coupling type rotary connector in which connectors connected to the two ends of the flexible cable are provided on the housings so as to achieve direct connection with external devices, such as an air bag inflator. In such a rotary connector, since the connectors are formed integrally with the housings, electrical connection between the flexible cable and the external devices is obtained at the same time as the assembly of the rotary connector in the steering device, thus simplifying the connection process between the rotary connector and the external devices.

However, in the direct coupling type direct connector, since a plurality of terminals thereof are exposed from the housing, a cover member must be provided on the direct connector for the purpose of preventing deformation of these terminals and enhancing the dust prevention property. Accordingly, in the assembly process of the rotary connector, the aforementioned locking member and the cover member must be mounted separately, making the assembly operation complicated. Further, in the inspection process conducted after assembly of the rotary connector in the steering device to check whether or not the rotary connector has been accurately connected to the external devices, electrical characteristics are satisfied only if the cover member has been removed and the external devices have been connected to the direct connecter. Thus, if the locking member is left unremoved, it is impossible in that inspection process to check whether or not the locking member has been improperly left connected to the rotary connector during assembly.

In view of the aforementioned problems of the prior art, a second object of the present invention is to provide a rotary connector which prevents accidental unremoval of a locking member.

SUMMARY OF THE INVENTION

To achieve the first object of the present invention, there is provided a rotary connector which comprises a pair of housings coupled to each other in such a manner as to be relatively rotatable, and a belt-like flexible cable wound in an annular space defined by the two housings, the flexible cable having a conductor for an air bag and another conductor parallel to the conductor. Two ends of each of the respective conductors of the flexible cable are electrically extended externally from the housings. At least one of the two externally extending ends of each of the connectors is connected to a corresponding terminal of a direct connector provided on the housing. The direct connector has a partitioning wall for separating a terminal connected to the conductor for the air bag from a terminal connected to the another conductor.

To achieve the first object of the present invention, there is further provided a rotary connector which comprises a pair of housings coupled to each other in such a manner as to be relatively rotatable, and a belt-like flexible cable wound in an annular space defined by the two housings, the flexible cable having conductors for an air bag and other conductors parallel to the conductors. Two ends of each of the respective conductors of the flexible cable are electrically connected to an external portion of the housings. At least one of the two externally extending ends of each of the conductors is connected to a corresponding terminal of a direct connector provided on the housing. The direct connector has a gap for separating terminals connected to the conductors for the air bag from terminals connected to the other conductors. A space of the gap is set to a value larger than a pitch at which the terminals connected to the other conductors are arranged.

To achieve the second object of the present invention, there is provided a rotary connector which comprises a pair of housings coupled to each other in such a manner as to be relatively rotatable, and a flexible cable wound in a space of the two housings, the flexible cable having a plurality of parallel conductors. Two ends of the flexible cable are electrically extended externally from the housings in such a state wherein the flexible cable is fixed to the housings. At least one of the two externally extending ends of the flexible cable is connected to an external device through a direct connector provided on the housing. A locking member for prohibiting free rotation of the two housings is removably mounted between the housings. A cover for covering the direct connector is formed integrally with the locking member.

According to a first aspect of the present invention provided to achieve the first object, the conductor of the flexible cable for the air bag and the other conductors thereof are connected to the corresponding terminals of the direct connector, respectively. The terminals of the direct connector, connected to the conductor for the air bag, and the terminals connected to the other conductors of the flexible cable are separated from each other by a partitioning wall or a gap.

According to a second aspect of the present invention provided to achieve the second object, since the locking member is mounted relative to the two housings which have been positioned at a neutral turning position in the rotary connector manufacturing process, the rotary connector which has been positioned at the neutral turning position can be assembled in a steering device in a state wherein free turning of the two housings is prohibited by the locking member. In that case, since the cover for covering the direct connector provided on the housing is formed integrally with the locking member, mounting of the locking member offers protection of the direct connector. Thus, separate process of covering the direct connector with a covering member is eliminated.

In the process of assembling the rotary connector in the steering device, when the locking member is removed from the two housings, the two housings are unlocked and at the same time the cover is removed from the direct connector, enabling the rotary connector to be electrically connected to external devices through the direct connector. In other words, the external devices can be connected to the direct connector only when the cover formed integrally with the locking member is removed. Thus, by inspecting electrical connection between the rotary connector with the external devices after the rotary connector has been assembled in the steering device, whether or not the locking member is removed can be determined, thus eliminating production of defective articles due to an accidental failure to remove the locking member.

DETAILED DESCRIPTION OF THE PREFERRED EMBODIMENTS

Embodiments of the present invention will be described below with reference to the accompanying drawings.

Figure 1:
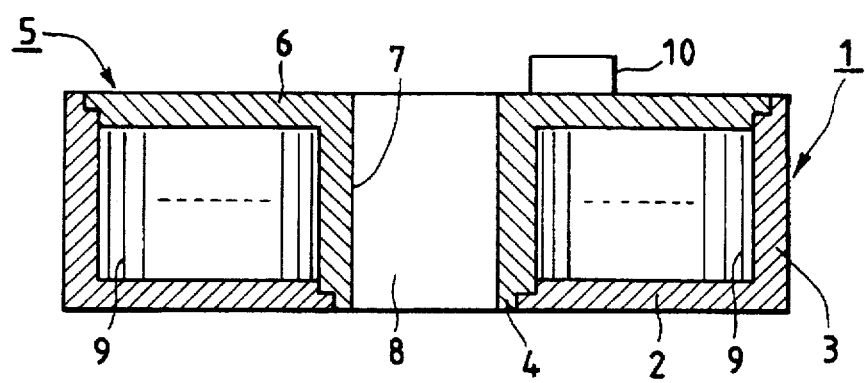
FIG. 1 is a vertical cross-sectional view of a first embodiment of a rotary connector according to the present invention.
Figure 2:
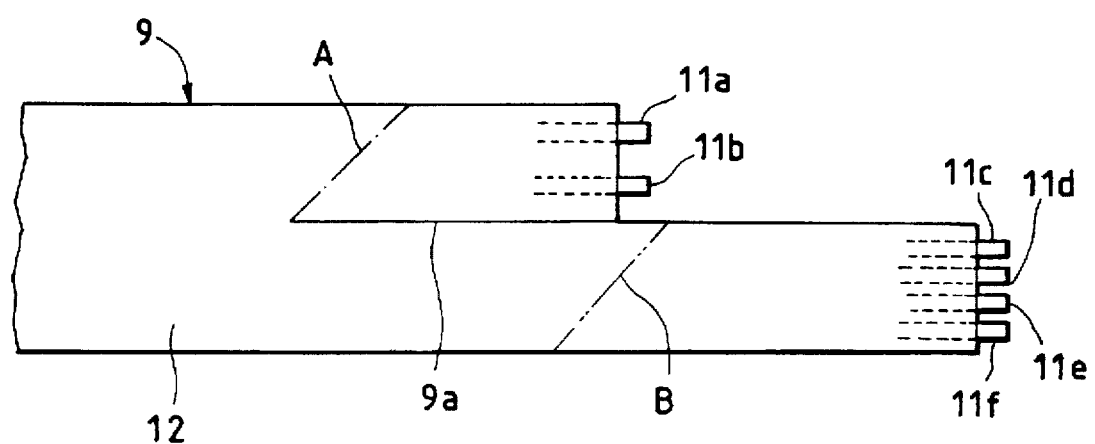
FIG. 2 is a plan view of a flexible cable provided in the rotary connector of FIG. 1.
Figure 3:
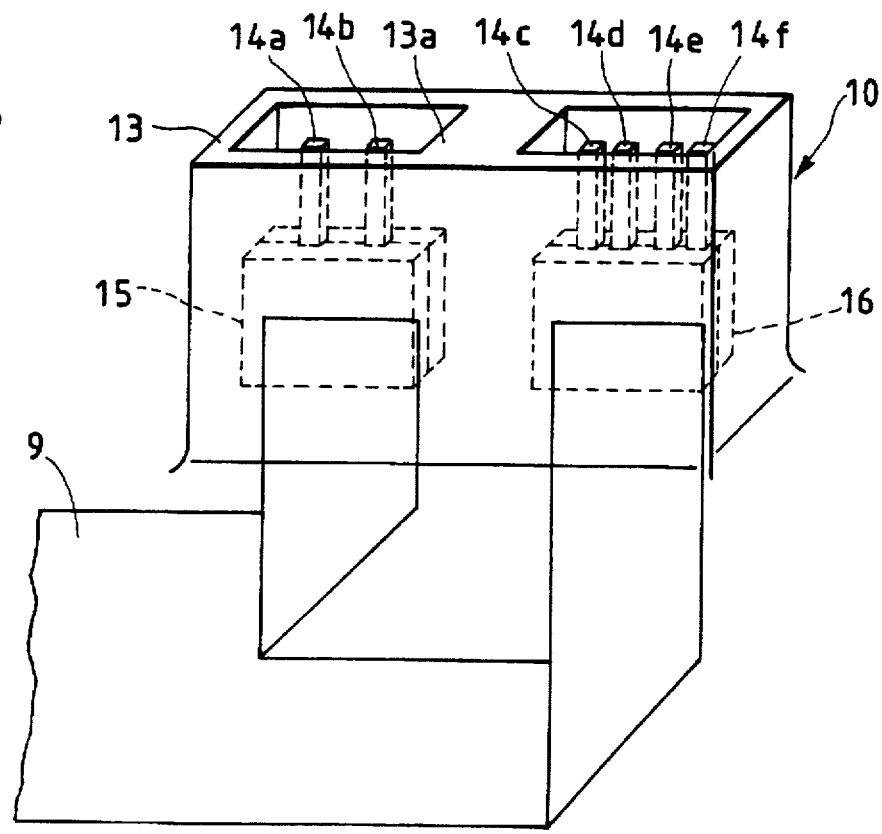
FIG. 3 is a perspective view of essential parts illustrating a connected state between a direct connector and the flexible cable provided in the rotary connector of FIG. 1.

FIG. 1 is a vertical cross-sectional view of a rotary connector according to a first embodiment of the present invention. FIG. 2 is a plan view of a flexible cable provided in the rotary connector shown in FIG. 1. FIG. 3 is a perspective view of essential parts illustrating a connected state of a direct connector provided in the rotary connector shown in FIG. 1 and the flexible cable.

Referring first to FIG. 1, a first housing 1 made of a synthetic resin has a disk-shaped bottom plate 2 and an outer cylindrical portion 3 connected to an outer peripheral edge of the bottom plate 2. The bottom plate 2 has a center hole 4 formed at a center thereof. A second housing 5, made of a synthetic resin, has a disk-shaped ceiling plate 6 and an inner cylindrical portion 7 connected to a central portion of the ceiling plate 6. The inner cylindrical portion 7 has a shaft insertion hole 8. The first and second housings 1 and 5 are coupled to each other in such a manner as to be rotatable relative to each other with the outer peripheral edge of the ceiling plate 6 being guided by the upper edge of the outer cylindrical portion 3 while the lower edge of the inner cylindrical portion 7 being guided by the inner edge of the bottom plate 2. A flexible cable 9 is housed in an annular space defined by the bottom plate 2 and outer cylindrical portion 3 of the first housing 1 and the ceiling plate 6 and the inner cylindrical portion 7 of the second housing 5. The flexible cable 9 is wound in a spiral fashion in the space. One end of the flexible cable 9 is led out from the first housing 1 in a state wherein it is fixed to the outer cylindrical portion 3. A special connector (not shown) is connected to a distal end of the portion of the flexible cable 9 which is led out from the first housing 1. The other end of the flexible cable 9 is led out of the second housing 5 through a direct connector 10.

As shown in FIG. 2, the flexible cable 9 is a belt-like flat cable in which a plurality of parallel conductor wires 11a through 11f are laminated by a pair of insulating films 12. The conductors 11a and 11b are used for connection with an air bag circuit. The conductor wires 11c to 11f are used for connection with a horn circuit, an automatic cruise control circuit or an air conditioner circuit. A current which flows through the air bag circuit is the largest, so the spacing between the air bag conductors 11a and 11b is larger than the spacing between the other conductor wires 11c to 11f. Further, very high connection reliability is required for the air bag circuit, so a noble metal plating, such as gold plating, is provided only on the surface of the portion of the air bag conductors which is exposed from the insulating films 12. A current which flows through the horn circuit is the second largest, so the conductor wire 11f located farthest from the air bag conductors 11a and 11b is used for the connection with the horn circuit. Further, a notch 9a is formed at one end portion of the flexible cable 9, whereby the flexible cable 9 is divided into the air bag conductors 11a and 11b and the other conductor wires 11c to 11f. The two parts are respectively folded at folding lines A and B which lie at 45 degrees with respect to the lateral direction of the flexible cable 9 so as to allow the flexible cable 9 to be directed toward the direct connector 10.

As shown in FIG. 3, the direct connector 10 includes a protruding casing 13 made of a synthetic resin and erected from the upper surface of the ceiling plate 6, a plurality of terminals 14a to 14f disposed in the protruding casing 13, and connecting plates 15 and 16 for connecting the terminals 14a to 14f with the conductor wires 11a to 11f. A partitioning wall 13a is formed integrally with the casing 13 at a central portion thereof to divide the terminals into the terminals 14a and 14b and the terminals 14c to 14f. The terminals 14a and 14b are also plated with a noble metal, such as gold. The terminals 14a and 14b are connected to the air bag conductors 11a and 11b within the one connecting plate 15 by means of, for example, soldering or spot welding. Similarly, the terminals 14c to 14f are connected to the conductor wires 11c to 11f within the other connecting plate 16 by means of, for example, soldering or spot welding. The connecting plates 15 and 16 are fixed in the protruding casing 13 by an adequate means, such as press fitting or snap-fastening.

The operation of the rotary connector according to the first aspect of the present invention will now be discussed. In the following description, the first housing 1 is used as a fixing member, while the second housing 5 is used as a movable member. In that case, the first housing 1 of the rotary connector is first fixed to a steering column. After a steering shaft is protruded from the shaft insertion hole 8 of the second housing 5, a steering hub is press-fitted with the steering shaft and a steering wheel formed integrally with the steering hub is fixed to the second housing 5. Thereafter, an external connector mounted on a car body is connected to the special connector led out from the first housing 1, and an external connector mounted on the steering wheel is connected to the direct connector 10 provided on the second housing 5, whereby an inflator for an air bag, a horn switch or control switches of an automatic cruise circuit or air conditioner circuit, mounted on the steering wheel, are connected to corresponding circuits mounted on the car body through the rotary connector.

In the above-described arrangement, when the steering wheel is rotated clockwise or counterclockwise, the rotational force of the steering wheel is transmitted to the second housing 5, rotating the second housing 5 in the same direction as that in which the steering wheel is rotated. For example, when the steering wheel is rotated counterclockwise from a neutral rotation position, the second housing 5 also rotates counterclockwise together with the steering wheel, making the flexible cable 9 wind toward the inner cylindrical portion 7. Conversely, when the steering wheel is rotated clockwise, the second housing 5 also rotates clockwise together with the steering wheel, making the flexible cable 9 unwind toward the outer cylindrical portion 3. In either state, electrical connection between the housings 1 and 5 is maintained through the flexible cable 9.

In the above-described first embodiment, at the connection portion between the flexible cable 9 and the direct connector 10, the individual conductor wires 11a to 11f of the flexible cable 9 are divided into the air bag conductors 11a and 11b and the other conductor wires 11c to 11f, and the terminals 14a to 14f of the direct connector 10, respectively connected to the conductor wires 11a to 11f, are divided into the air bag terminals 14a and 14f and the other terminals 14c to 14f by the insulating partitioning wall 13a. Thus, the conductors and terminals for the air bag circuit, which require high connection reliability, can be reliably insulated electrically from the conductors and terminals of the other circuits. When electrical insulation of the conductors and terminals of the air bag circuit from the conductors and terminals of the other circuits can be conducted reliably, short-circuiting, which would occur between the other circuits due to the current which flows in the air bag circuit into the other circuits, can be prevented. Accordingly, the pitch at which the conductors 11c to 11f used for connection with the circuits other than the air bag circuit can be reduced, and even when the number of conductor wires 11c to 11f is increased, a great increase in the width of the flexible cable 9 can thus be avoided. Further, since the conductor wire 11f located farthest from the air bag conductors 11a and 11b is used for connection with the horn circuit, the insulation distance between the air bag circuit in which a largest amount of current flows and the horn circuit in which a second largest amount of current flows can be increased, thus enhancing electrical insulation of the air bag circuit. Further, since the flexible cable 9 is divided into the air bag conductors 11a and 11b and the conductor wires 11c to 11f for the circuits other than the air bag circuit at an end portion of the cable, the exposed ends of the air bag conductors 11a and 11b alone are dipped into a plating tank with the other conductor wires 11c to 11f on which expensive noble metal plating is conducted being not plated. Consequently, production cost can be reduced.

Figure 4:
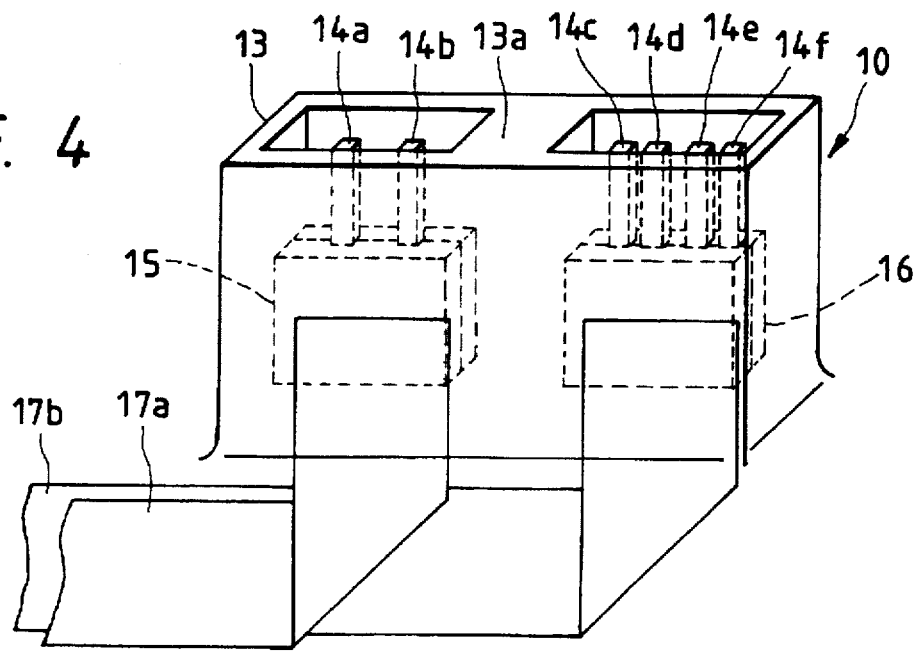
FIG. 4 is a perspective view of essential parts illustrating a connected state between a direct connector and a flexible cable which are provided in a second embodiment of the rotary connector according to the present invention.

FIG. 4 is a perspective view of essential parts illustrating a connecting state between the direct connector and the flexible cable provided in the rotary connector according to a second embodiment of the present invention. Reference numerals in FIG. 4 identical to those in FIGS. 1 to 3 represent similar or identical elements.

The second embodiment differs from the first embodiment in that the first and second flexible cables 17a and 17b are employed and in that the air bag conductors 11a and 11b are provided on the first flexible cable 17a while the other conductor wires 11c to 11f are provided on the second flexible cable 17b. The other structure of the second embodiment is the same as that of the first embodiment. That is, the two flexible cables 17a and 17b are wound in the annular space in a state wherein they are placed on top of the other in the direction of thickness thereof over the entire length thereof. At least one end portions of the conductor wires 11a to 11f are connected to the corresponding terminals 14a to 14f of the direct connector 10.

In the second embodiment, since the air bag conductors 11a and 11b and the conductors 11c to 11f for the circuits other than the air bag circuit are allocated to the first and second flexible cables 17a and 17b placed on top of the other in the direction of thickness thereof, respectively, insulation between the air bag conductors 11a and 11b and the conductor wires 11c to 11f for the circuits other than the air bag circuit can be enhanced by the insulating films of the flexible cables 17a and 17b and the width of the flexible cables 17a and 17b can be narrowed. Thus, the second embodiment is suited to achieve a reduction in the thickness of the rotary connector in addition to the effects offered by the first embodiment.

Figure 5:
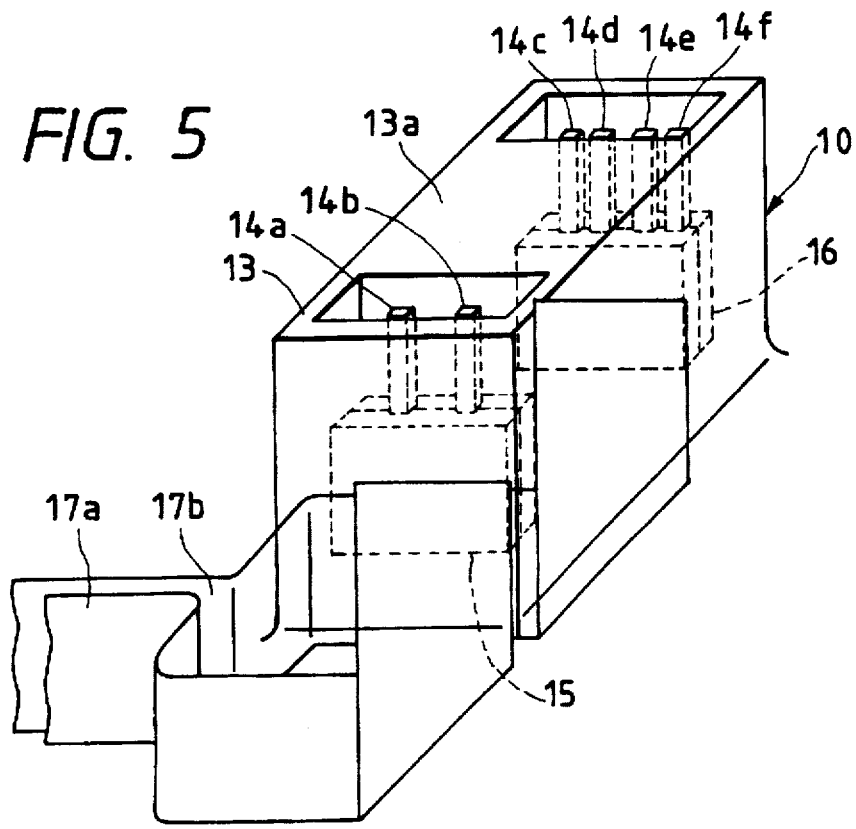
FIG. 5 is a perspective view of essential parts illustrating a connected state between a direct connector and a flexible cable which are provided in a third embodiment of the rotary connector according to the present invention.

FIG. 5 is a perspective view of essential parts illustrating a connected state between the direct connector and the flexible cables provided in the rotary connector according to a third embodiment of the present invention. Reference numerals in FIG. 5 identical to those in FIG. 4 represent similar or identical elements.

The third embodiment according to the present invention differs from the second embodiment in that the terminals of the direct connector 10 are divided into the air bag terminals 14a and 14b and the terminals 14c to 14f for the circuits other than the air bag circuit in the direction of thickness of the two flexible cables 17a and 17b through the partitioning wall 13a. The other structure is the same as that of the second embodiment.

Figure 6:
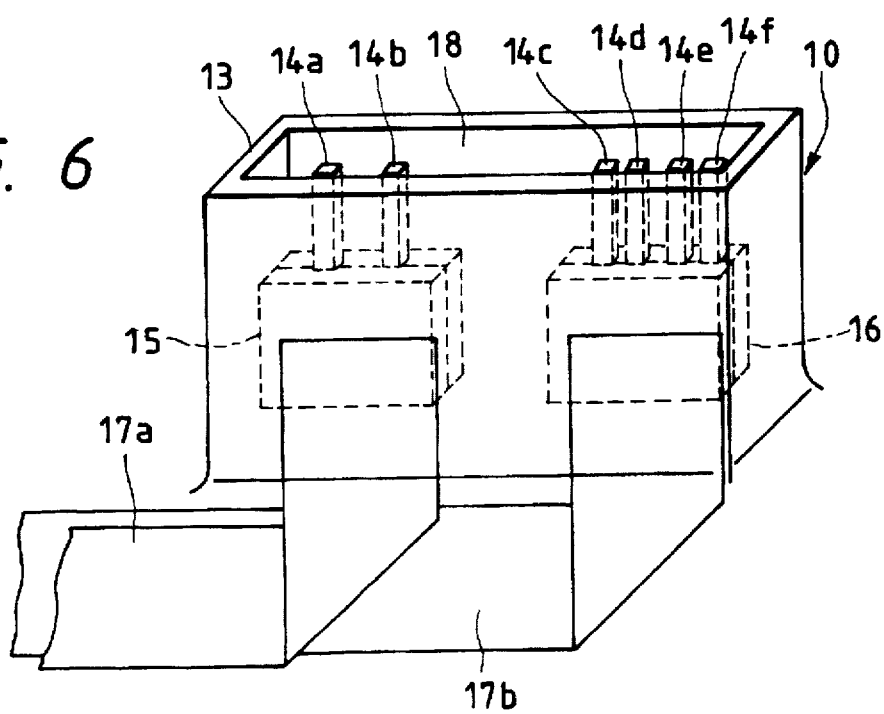
FIG. 6 is a perspective view of essential parts illustrating a connected state between a direct connector and a flexible cable which are provided in a fourth embodiment of the rotary connector according to the present invention.

FIG. 6 is a perspective view of essential parts illustrating a connected state between the direct connector and the flexible cable provided in the rotary connector according to a fourth embodiment of the present invention. Reference numerals in FIG. 6 identical to those in FIG. 4 represent similar or identical elements.

The fourth embodiment differs from the second embodiment in that the air bag terminals 14a and 14b are separated from the terminals 14c to 14f for the circuits other than the air bag circuit by a gap 18. The other structure of the fourth embodiment is basically the same as that of the second embodiment. The gap 18 is set to a value sufficiently large as compared with the pitch between the air bag terminals 14a and 14b or the pitch (spacing) between the other, terminals 14c to 14f, and has the same function as that of the partitioning wall 13a which has been described in the first to third embodiments.

There is no limitation to the shape of the partitioning wall 13a employed in the first to third embodiments so long as the creepage distance for insulation between the air bag terminals 14a and 14b and the terminals 14c to 14f for the circuits other than the air bag circuit is long.

While the above embodiments are shown in FIGS. 1 to 6, wherein the first housing 1 is used as the fixing member and the second housing 5 is used as the movable member, other embodiments of the invention might include a rotary connector wherein the second housing 5 is used as the fixing member and the first housing 1 is used as the movable member.

Similarly, while the direct coupling type direct connector 10 is provided only on the second housing 5 while the special connector to be led out of the housing is provided on the first housing 1, alternate embodiments might contemplate a rotary connector in which the direct connector is provided only on the first housing while the special connector is provided on the second housing 5 and a rotary connector in which direct coupling type connectors are provided on both the housings 1 and 5.

A second aspect of the present invention will be described with reference to FIGS. 7 through 9.

Figure 7:
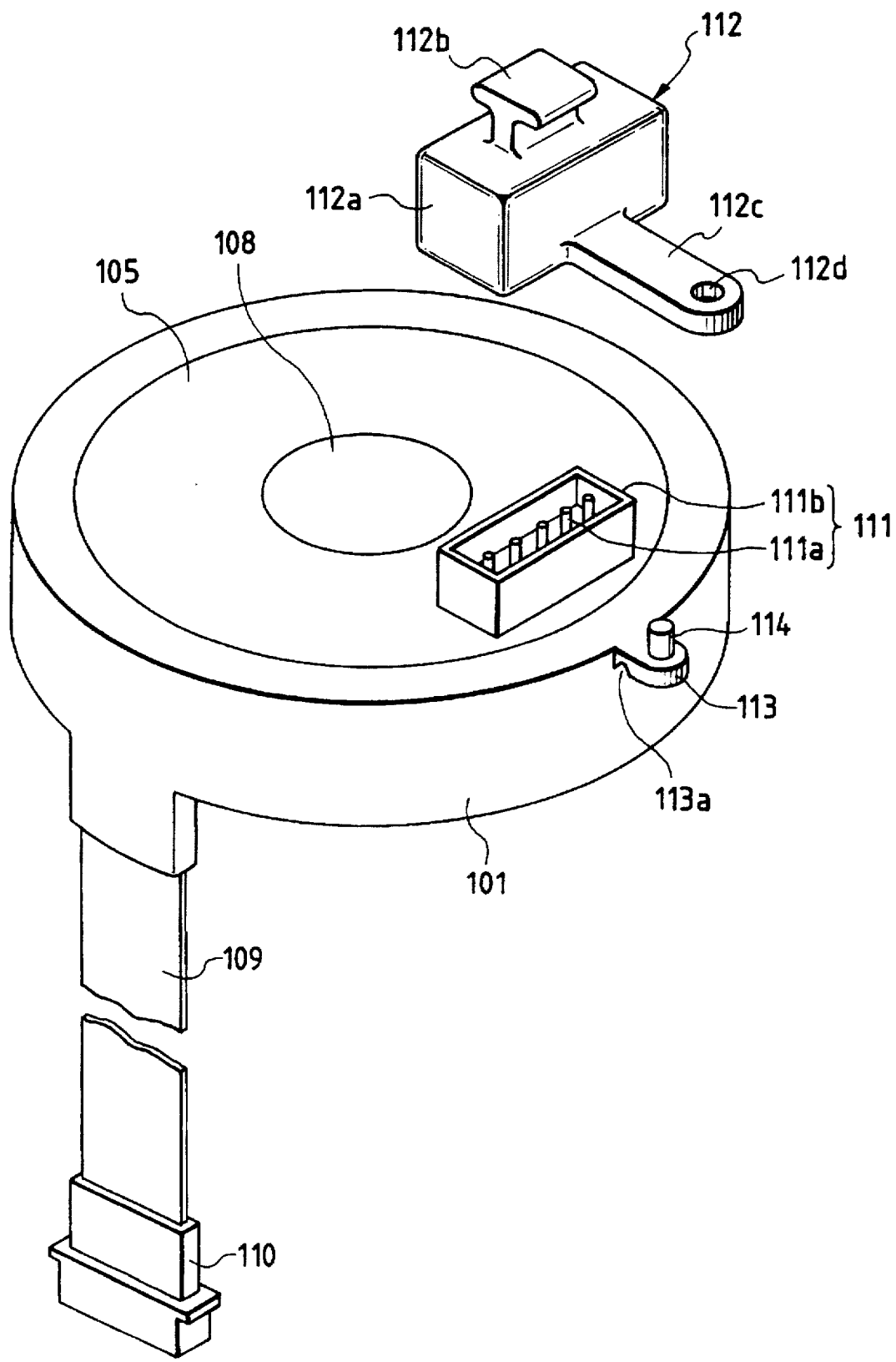
FIG. 7 is a perspective view of a fifth embodiment of the rotary connector according to the present invention.

FIG. 7 is a perspective view of a rotary connector according to a fifth embodiment of the present invention. FIG. 8 is a vertical cross-sectional view illustrating a state wherein a locking member is mounted on the rotary connector. In these figures, a first housing 101 made of a synthetic resin has a disk-shaped bottom plate 102 and an outer cylindrical portion 103 erected from an outer peripheral edge of the bottom plate 102. The bottom plate 102 has a center hole 104 formed at a center thereof. A second housing 105, made of a synthetic resin, has a disk-shaped ceiling plate 106 and an inner cylindrical portion 107 connected to a central portion of the ceiling plate 106. The inner cylindrical portion 107 has a shaft insertion hole 108. The first and second housings 101 and 105 are coupled to each other in such a manner as to be rotatable relative to each other with the outer peripheral edge of the ceiling plate 106 being guided by the upper edge of the outer cylindrical portion 103 while the lower edge of the inner cylindrical portion 107 being guided by the inner edge of the bottom plate 102. However, free rotation of the first and second housings 101 and 105 is prohibited by a locking member which will be described later. A flexible cable 109 is a belt-like flat cable in which a plurality of parallel conductor wires are laminated by a pair of insulating films. The flexible cable 109 is housed in an annular space defined by the bottom plate 102 and outer cylindrical portion 103 of the first housing 101 and the ceiling plate 106 and the inner cylindrical portion 107 of the second housing 105. The flexible cable 109 is wound in a spiral fashion in the space. One end of the flexible cable 109 is led out from the first housing 101 in a state wherein it is fixed to the outer cylindrical portion 103. A special connector 110 is connected to a distal end of the portion of the flexible cable 109 which is led out from the first housing 101. The other end of the flexible cable 109 is led out of the second housing 105 through a direct-coupling type connector 111 erected from the upper surface of the ceiling plate 106. The direct connector 111 includes a plurality of terminals 111a connected to the respective conductors of the flexible cable 109, and a protruding casing 111b for enclosing the terminals 111a. The terminals 111a are exposed through an upper opening of the protruding casing 111b.

A locking member 112 includes a box-shaped cover 112a which is open at an under surface thereof, a knob portion 112b protruding upward from the cover 112a, and an arm 112c extending horizontally from a side surface of the cover 112a. The locking member 112 is a one-unit member made of a synthetic resin or hard rubber. The cover 112a has an inner space large enough to cover the protruding casing 111b of the connector 111. A distal end portion of the arm 112c has a hole 112d. Corresponsive to the locking member 112, a protrusion 113 is formed integrally with the outer cylindrical portion 103 of the first housing 101 at an outer peripheral surface thereof. The protrusion 113 has a boss 114 on an upper surface thereof. In addition, thin portions 113a are formed at a connecting portion between the outer peripheral surface of the outer cylindrical portion 103 and the protrusion 113. The thin portions 113a have the function of rupture portions when the protrusion 113 is removed from the first housing 101.

FIG. 7 illustrates a non-locked state wherein the locking member 112 is not yet mounted on the rotary connector. FIG. 8 illustrates a locked state wherein the locking member 112 is mounted on the rotary connector. In that locked state, the cover 112a of the locking member 112 is covered on the protruding casing 111b of the connector 111, and fixed to the protrusion 113 by heat caulking the hole 112d of the arm 112c to the boss 114.

The operation of the rotary connector according to the present invention will now be discussed. In the following description, the first housing 101 is used as a fixing member, while the second housing 105 is used as a movable member. In that case, the first housing 101 of the rotary connector is fixed to a steering column, and the second housing 105 is fixed to a steering wheel. Such a rotary member must be assembled in a steering device in such a manner that the second housing 105 serving as the movable member can be rotated by the same angle from the neutral rotation position of the steering wheel in two directions. To achieve this, in the manufacturing process of the rotary connector, after the first and second housings 101 and 105 are rotatably coupled to each other in a state wherein the flexible cable 109 is wound in the space, they are rendered to a neutral rotation state, as shown in FIG. 7. Thereafter, as shown in FIG. 8, the cover 112a of the locking member 112 is covered on the direct connector 111 of the second housing 105 and the hole 112d of the arm 112c is fitted with the boss 114. In that state, the boss 114 is heat caulked to fix the arm 112c to the protrusion 113 of the first housing 101. Thus, even if a rotational force is applied to the second housing 105, relative rotation of the first and second housings 101 and 105 could be prevented by the locking member 112 because the protruding casing 111b of the direct connector 111 abuts against a restriction wall of the cover 112a located in the direction of rotation of the protruding casing 111b. Consequently, even if vibrations act on the rotary connector during, for example, transportation, removal of the locking member 112 from the rotary connector would be prevented due to heat caulking of the boss 114. This enables the rotary connector to be assembled in the steering device in the neutral rotation state.

To assemble the rotary connector in the steering device (not shown), the first housing 101 of the rotary connector with the locking member 112 mounted thereon is fixed to the steering column, and a steering shaft is protruded from the shaft insertion hole 108 of the second housing 105. Next, the operator grips the knob portion 112b with a jig or his or her fingers and pulls up the locking member 112. In the pulling process, the thin portions 113a rupture and the protrusion 113 fixed to the arm 112c is separated from the first housing 101. Thus, removal of the locking member 112 from the rotary connector is facilitated, and at the same time, the cover 112a can be removed from the direct connector 111. Thereafter, a steering hub is press-fitted on the steering shaft, and a steering wheel provided integrally with the steering hub is fixed to the second housing 105, whereby the neutral rotation position of the rotary connector can be brought into coincidence with the neutral rotation position of the steering wheel. A connector 110 led out of the first housing 101 through the flexible cable 109 is connected to an external device, such as an air bag driving circuit or a horn circuit, mounted on the car body, and the connector 111 provided on the second housing 105 is connected to an external device, such as an air bag inflator or a horn switch, mounted on the steering wheel.

When assembly of the rotary connector in the steering device is completed, inspection is conducted to check whether or not the rotary connector is connected accurately to the external devices. In this inspection in which electrical connection between the corresponding external devices is checked, if electrical characteristics are satisfactory, electrical connection between the rotary connector and the external devices are determined as satisfactory and the locking member 112 are determined as removed from the rotary connector. That is, since this embodiment is designed such that the external devices can be connected to the direct connector 111 only when the cover 112a formed integrally with the locking member 112 has been removed, whether or not the locking member 112 has been removed can be determined by inspecting electrical connection between the rotary connector and the external devices, and production of defective articles due to the locking member 112 being accidentally left on the rotary connector can thus be prevented.

In the above-described arrangement, when the steering wheel is rotated clockwise or counterclockwise, the rotational force of the steering wheel is transmitted to the second housing 105, rotating the second housing 105 in the same direction as that in which the steering wheel is rotated. For example, when the steering wheel is rotated counterclockwise from a rotation neutral position, the second housing 105 also rotates counterclockwise together with the steering wheel, making the flexible cable 109 wind toward the inner cylindrical portion 107. Conversely, when the steering wheel is rotated clockwise, the second housing 105 also rotates clockwise together with the steering wheel, making the flexible cable 199 unwind toward the outer cylindrical portion 103. In either state, electrical connection between the housings 101 and 105 is maintained through the flexible cable 109.

In the fifth embodiment of the invention, since the cover 112a for protecting the direct connector 111 of the second housing 105 is formed integrally with the locking member 112 for inhibiting free rotation of the housings 101 and 105, protection of the direct connector 111 can be achieved when the locking member 112 is mounted on the rotary connector. Thus, it is not necessary for the direct connector 111 to be covered with a covering member, facilitating the assembly operation. Furthermore, since the cover 112a has the restriction wall which abuts against the protruding casing 111b of the direct connector 111 in the direction of rotation thereof, that is, since the direct connector 111 constitutes part of the locking mechanism, it is not necessary for the second housing 105 to be provided with a rotation stopping member which is to abut against the locking member 112, simplifying the locking mechanism. Furthermore, since the locking member 112 is fixed to the protrusion 113 of the first housing 101 to prevent slip off of the locking member 112 from the rotary connector, it is not necessary for the cover 112a to be mounted tightly on the direct connector 111, thus simplifying mounting and removal of the cover 112a.

Figure 8:
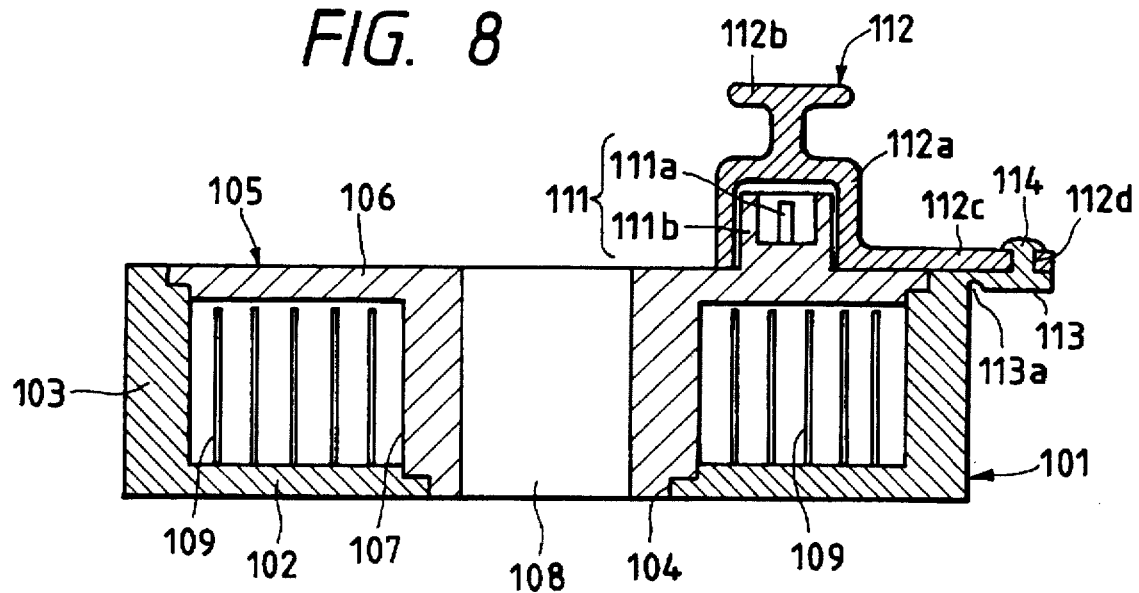
FIG. 8 is a vertical cross-sectional view illustrating a state wherein a locking member is mounted on the rotary connector of FIG. 7.
Figure 9:
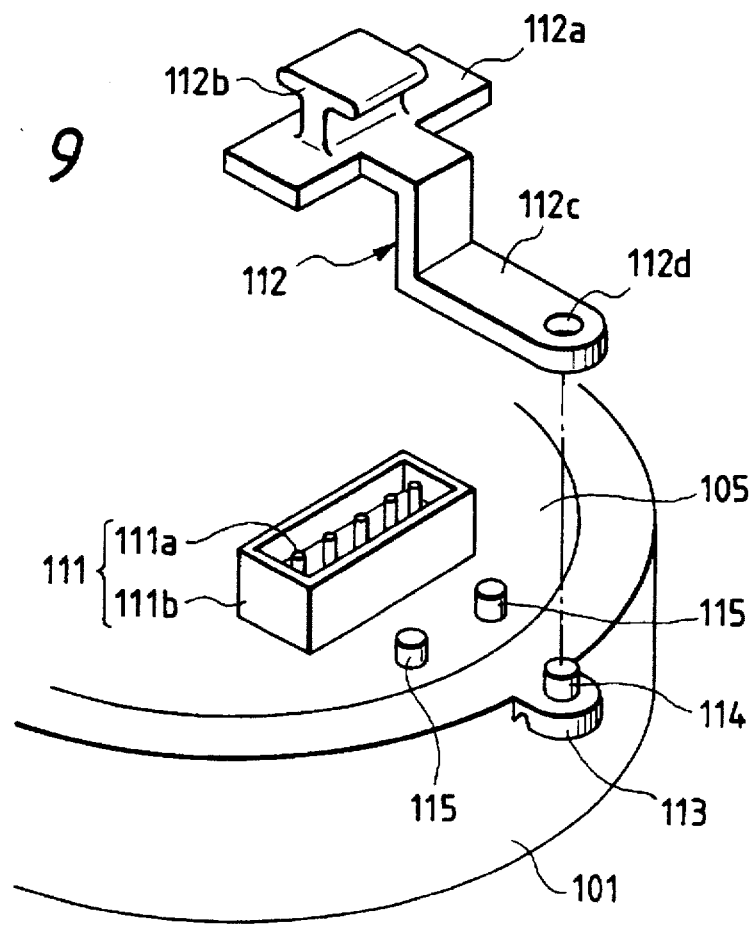
FIG. 9 is a perspective view of essential parts of a sixth embodiment of the rotary connector according to the present invention.

FIG. 9 is a perspective view of essential parts of the rotary connector according to a sixth embodiment of the present invention. Reference numerals in FIG. 9 identical to those in FIGS. 7 and 8 represent similar or identical elements.

The sixth embodiment of the invention differs from the fifth embodiment in that the cover 112a of the locking member 112 is shaped in the form of a flat plate and in that a pair of restricting pins 115 are erected on the second housing 105 as rotation stopping members of the locking member 112. The other structure of the sixth embodiment is the same as that of the fifth embodiment. In that case, although the cover 112a has only the protection function of covering the upper opening of the connector 111, since the arm 112c abuts against the restriction pins 115 in the direction of rotation of the second housing 105, relative rotation of the first and second housings 101 and 105 is prohibited by the locking member 112. In that case, the simple structure of the restriction pins 115 is enough to prevent relative rotation of the first and second housings 101 and 105.

While the fifth and sixth embodiments of %he invention are substantially shown in FIGS. 7 to 9, wherein the first housing 101 acts as the fixing member while the second housing 105 serves as the movable member, alternate embodiments of the invention might include a rotary connector wherein the second housing 105 serves as the fixing member and the first housing 101 serves as the movable member.

Similarly, the direct coupling type direct connector 111 is shown in the fifth and sixth embodiments as being provided only on the second housing 105 with the externally extending connector 110 provided on the first housing 101, alternate embodiments might contemplate a rotary connector wherein the connectors which are to be provided on both the housings 101 and 105 are direct connectors and a rotary connector wherein one end of the locking member is fixed to the second housing 105 with the direct connector covered with a cover being provided on the first housing 101.

Similarly, while the locking member 112 is shown in the fifth and sixth embodiments as being fixed to the protrusion 113 by heat caulking the boss 114 which has been fitted with the hole 112d formed in the locking member 112, alternate embodiments might include the locking member 112 that is fixed to the protrusion 113 by merely press-fitting the boss 114 into the hole 112d to simplify the process and thereby facilitate the assembly operation. Alternatively, the locking member 112 may have a boss with the protrusion 113 having a hole, unlike the cases of the above-described embodiments. similarly, while the thin portions 113a are shown in the fifth and sixth embodiments as being provided at the proximal end of the protrusion 113, alternate embodiments of the invention might include thin portions that are provided at a breaking point of the locking member 112 alone or that are provided on both the locking member 112 and the protrusion 13.

As will be understood from the foregoing description, in the present invention, even though the number of conductors of the flexible cable and the number of terminals of the direct connector which are connected to the respective conductors are increased, the air bag conductor and the terminal connected thereto are electrically insulated reliably from the other conductors and terminals, thus making the provision of a rotary connector suitable for use with multiple circuits possible.

Furthermore, in the present invention, since the locking member is mounted relative to the both housings which have been positioned to a rotation neutral position in the manufacturing process of the rotary connector, free rotation of the housings is locked and the direct connector provided on the housing is protected, thus simplifying the assembly operation. Further, when the locking member is removed from the two housings in the process of assembly of the rotary connector in a steering device, the two housings are unlocked while the cover is removed from the direct connector. Thus, whether or not the locking member has been removed can be determined by inspecting electrical connection between the rotary connector and external devices, and the locking member being accidentally left on the rotary connector can be reliably prevented.

What is claimed is:

1. A rotary connector comprising:

a first housing;

a second housing rotatably coupled to the first housing, the first and second housings defining an annular space therebetween; and first and second pluralities of conductors wound in the annular space, first and second ends of each of the first and second pluralities of conductors being electrically connected to an exterior of the first and second housings, at least one of said first and second ends of each of said first and second pluralities of conductors being connected to a corresponding terminal of a direct connector provided on one of said first and second housings, wherein said direct connector has a partitioning wall for separating a first set of said terminals connected to said first pluralities of conductors from a second set of said terminals connected to said second pluralities of conductors.

2. A rotary connector according to claim 1, further comprising first and second flexible cables, said first and second flexible cables respectively including said first plurality of conductors and said second plurality of conductors arranged in parallel, wherein said first and second flexible cables are wound in said annular space such that said first and second flexible cables are overlapped.

3. A rotary connector according to claim 1, further comprising a flexible cable, said flexible cable including said first plurality of conductors and said second plurality of conductors arranged in parallel.

* * * * *